(12) United States Patent
Sugiyama

(10) Patent No.: US 9,282,210 B2
(45) Date of Patent: Mar. 8, 2016

(54) IMAGE PROCESSING APPARATUS

(71) Applicant: BROTHER KOGYO KABUSHIKI KAISHA, Nagoya-shi, Aichi-ken (JP)

(72) Inventor: Takashi Sugiyama, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/612,752

(22) Filed: Feb. 3, 2015

(65) Prior Publication Data
US 2015/0222773 A1 Aug. 6, 2015

(30) Foreign Application Priority Data
Feb. 4, 2014 (JP) .................................. 2014-019374

(51) Int. Cl.
G06K 15/00 (2006.01)
H04N 1/00 (2006.01)
(52) U.S. Cl.
CPC ........ H04N 1/00856 (2013.01); G06K 15/4095 (2013.01); H04N 2201/0094 (2013.01)
(58) Field of Classification Search
USPC ........................ 358/1.14, 3.28, 1.15; 713/176
See application file for complete search history.

(56) References Cited

U.S. PATENT DOCUMENTS

| | | | | |
|---|---|---|---|---|
| 2005/0097332 A1* | 5/2005 | Imai | ............................... | 713/176 |
| 2014/0090035 A1* | 3/2014 | Kodama | ............................. | 726/6 |
| 2014/0112553 A1* | 4/2014 | Yamaguchi | ................... | 382/118 |
| 2015/0089613 A1* | 3/2015 | Tippett et al. | ..................... | 726/7 |
| 2015/0137936 A1* | 5/2015 | Baldwin et al. | ................ | 340/5.6 |

FOREIGN PATENT DOCUMENTS

JP 2008-211646 A 9/2008

* cited by examiner

*Primary Examiner* — Jerome Grant, II
(74) *Attorney, Agent, or Firm* — Merchant & Gould P.C.

(57) ABSTRACT

An image processing apparatus includes an internal obtaining device configured to obtain authentication information, a communication unit configured to perform communication with an external obtaining device that is configured to obtain authentication information, an image processing unit configured to execute at least one of image reading and image formation, and a controller configured to execute determination processing including granting a permission for executing image processing by the image processing unit when the controller determines that the authentication based on the authentication information obtained from the internal obtaining device and first reference information is successful, and granting the permission for executing the image processing when the controller determines that the authentication based on the authentication information obtained from the external obtaining device and second reference information is successful, the second reference information being different from the first reference information.

22 Claims, 9 Drawing Sheets

FIG. 4

■ AUTHENTICATION DEVICE SETTING —61

[AUTHENTICATION DEVICE STATES] —62
INTERNAL DEVICE: VALID    USER INFORMATION ADDRESS
EXTERNAL DEVICE: VALID    USER INFORMATION ADDRESS    192.168.10.5

[AUTHENTICATION CARD TYPE] —63
INTERNAL DEVICE   ☑ A-TYPE   ☐ B-TYPE
EXTERNAL DEVICE   ☑ B-TYPE   ☑ C-TYPE

■ USER INFORMATION —65,75

| | UserName | Password | Card ID | | |
|---|---|---|---|---|---|
| 1: | AAA | ******** | ☑ INTERNAL: 12345678 | ☑ EXTERNAL: 4128598314562460 |
| 2: | BBB | ******** | ☑ INTERNAL: 21340939 | ☐ EXTERNAL: |
| 3: | CCC | ******** | ☑ INTERNAL: 74629141 | ☐ EXTERNAL: |
| 4: | DDD | ******** | ☑ INTERNAL: 29485012 | ☐ EXTERNAL: |
| 5: | EEE | ******** | ☑ INTERNAL: 45593124 | ☑ EXTERNAL: 4559208345512341 |
| 6: | FFF | ******** | ☑ INTERNAL: 26734241 | ☐ EXTERNAL: |
| 7: | GGG | ******** | ☑ INTERNAL: 92346647 | ☐ EXTERNAL: |
| 8: | HHH | ******** | ☑ INTERNAL: 85978612 | ☐ EXTERNAL: |
| 9: | III | ******** | ☐ INTERNAL: | ☑ EXTERNAL: 4545689148501241 |
| 10: | JJJ | ******** | ☐ INTERNAL: | ☑ EXTERNAL: 7501375105012341 |

IMAGE PROCESSING APPARATUS

CROSS-REFERENCE TO RELATED APPLICATIONS

This application claims priority from Japanese Patent Application No. 2014-019374 filed on Feb. 4, 2014, the entire subject-matter of which is incorporated herein by reference.

TECHNICAL FIELD

The disclosure relates to a technology of determining whether it is permitted to use an image processing apparatus on the basis of authentication information.

BACKGROUND

There has been known an image forming apparatus configured to request an input of predetermined authentication information at the start of a printing. An external authentication device configured to read out the authentication information is detachably mounted to the image forming apparatus. When the authentication device is mounted and the authentication information read from the authentication device coincides with pre-registered reference information, the image forming apparatus permits an information processing apparatus to transmit printing information to the image forming apparatus and executes printing processing.

SUMMARY

Illustrative aspects of the present invention provide a technology enabling an image processing apparatus capable of coping with a plurality of obtaining devices to operate by using authentication information.

According to one illustrative aspect of the present invention, there may be provided an image processing apparatus including: an internal obtaining device configured to obtain authentication information; a communication unit configured to perform communication with an external obtaining device that is configured to obtain authentication information; an image processing unit configured to execute at least one of image reading and image formation; and a controller, wherein the controller is configured to execute determination processing including: in a case that the controller determines that an authentication based on the authentication information obtained from the internal obtaining device and first reference information is successful, granting a permission for executing image processing by the image processing unit; and in a case that the controller determines that an authentication based on the authentication information obtained from the external obtaining device and second reference information is successful, granting a permission for executing the image processing by the image processing unit, wherein the second reference information is different from the first reference information.

According to another illustrative aspect of the present invention, there may be provided an image processing apparatus including: a first obtaining device configured to obtain a first authentication information; a communication device configured to communicate with a second obtaining device, wherein the second obtaining device is configured to obtain a second authentication information; an image processing unit configured to execute at least one of image reading and image formation; a storage unit configured to store a first reference information; a network interface configured to communicate with a server that is configured to store a second reference information; and a controller, wherein the controller is configured to: in a case that the controller receives the first authentication information via the first obtaining device, retrieve the first reference information from the storage unit and determine whether the first authentication information matches the first reference information; and in a case that the controller receives the second authentication information via the second obtaining device, retrieve the second reference information from the server via the network interface and determine whether the second authentication information matches the second reference information.

BRIEF DESCRIPTION OF THE DRAWINGS

Illustrative aspects of the invention will be described in detail with reference to the following figures where in:

FIG. 4 illustrates a setting screen that is displayed when an external authentication device is selected as an obtaining source;

DETAILED DESCRIPTION

General Overview

Figure 1:
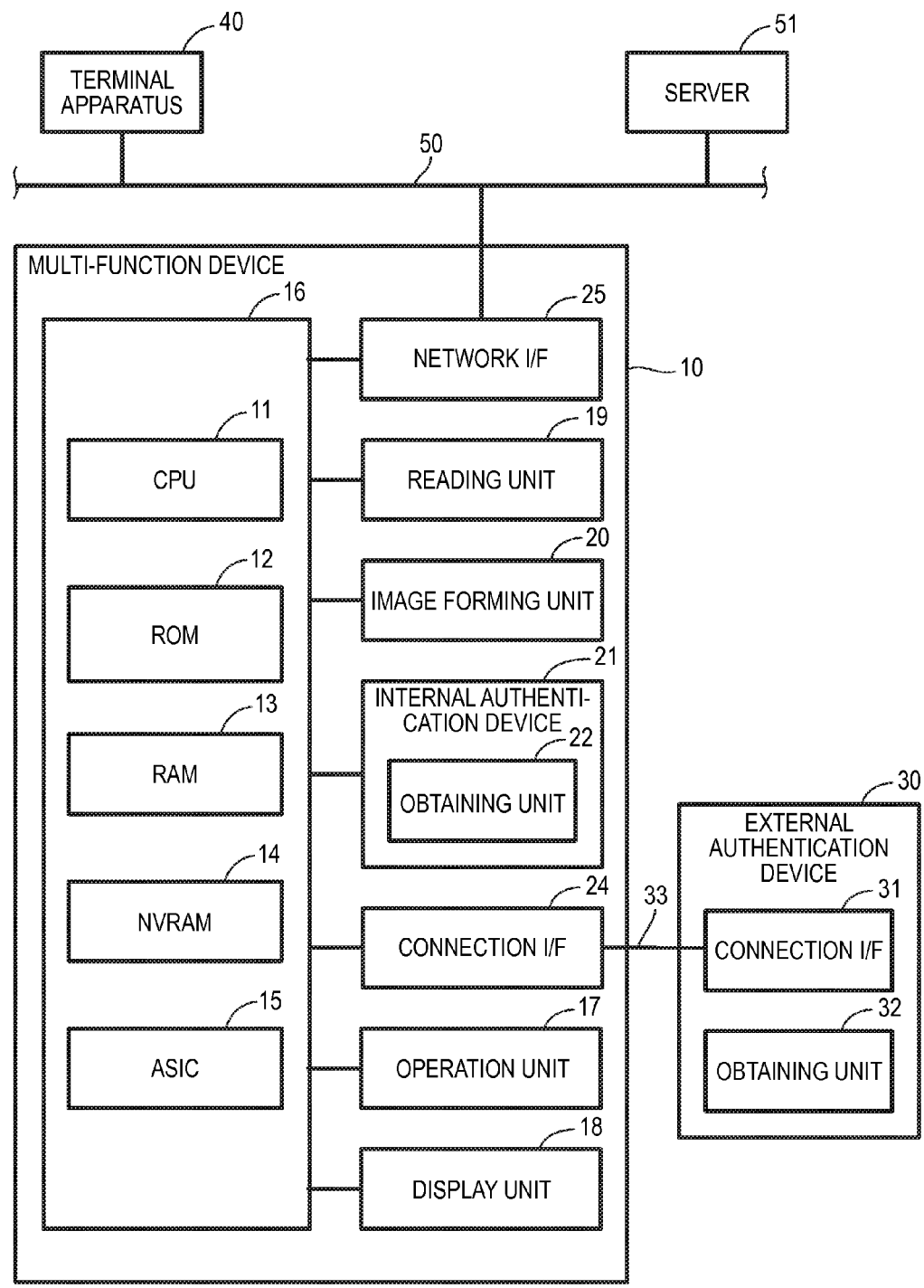
FIG. 1 is a block diagram showing a schematic configuration of an image processing system.

In an image processing apparatus such as an image forming apparatus, an obtaining device configured to obtain the authentication information may be embedded therein. It has not been sufficiently examined how to operate the image processing apparatus by using the authentication information when an external obtaining device is further mounted to the image processing apparatus.

Therefore, illustrative aspects of the present invention provide a technology enabling an image processing apparatus capable of coping with a plurality of obtaining devices to operate by using authentication information.

According to one illustrative aspect of the present invention, there may be provided an image processing apparatus including: an internal obtaining device configured to obtain authentication information; a communication unit configured to perform communication with an external obtaining device that is configured to obtain authentication information; an image processing unit configured to execute at least one of image reading and image formation; and a controller, wherein the controller is configured to execute determination processing including: in a case that the controller determines that an authentication based on the authentication information obtained from the internal obtaining device and first reference information is successful, granting a permission for executing image processing by the image processing unit; and in a case that the controller determines that an authentication based on the authentication information obtained from the external obtaining device and second reference information is successful, granting the permission for executing the image processing by the image processing unit, wherein the second reference information is different from the first reference information.

The image processing apparatus is configured to determine whether it is possible to use the image processing unit on the basis of the first reference information with respect to the authentication information from the internal obtaining device, and to determine whether it is possible to use the image processing unit on the basis of the second reference information different from the first reference information with respect to the authentication information from the external obtaining device. Thereby, it is possible to appropriately use the authentication information obtained from each of the plurality of obtaining devices by the reference information.

The image processing apparatus may further comprise an input unit, wherein the controller may be configured to execute device setting processing of setting the reference information corresponding to at least one obtaining device on the basis of an input from the input unit.

In the image processing apparatus, since the reference information corresponding to at least one obtaining device is set on the basis of the input from the input unit, it is possible to set the reference information to the obtaining device in accordance with the user's intention.

The image processing apparatus may further comprise an input unit, wherein the controller may be configured to execute allotment processing of allotting authentication information which is set as a target for the internal obtaining device and authentication information which is set as a target for the external obtaining device, on the basis of an input from the input unit.

The image processing apparatus is configured to allot the authentication information, which is set as a target for the internal obtaining device, and the authentication information, which is set as a target for the external obtaining device, on the basis of the input from the input unit. Thereby, it is possible to appropriately use the authentication information obtained from each of the plurality of obtaining devices in accordance with the input from the input unit.

In the image processing apparatus, the controller may be further configured to execute: determination processing of determining whether corresponding reference information can be referred to, for at least one obtaining device; and denial processing of not receiving the authentication information from the obtaining device corresponding to the reference information for which it is determined in the determination processing that the reference information cannot be referred to.

In the image processing apparatus, the authentication information from the obtaining device for which it is determined that the corresponding reference information cannot be referred to is not received. Therefore, the processing of determining whether it is possible to use the image processing unit with respect to the corresponding authentication information is suppressed, so that it is possible to simplify the processing in the controller.

In the image processing apparatus, in the denial processing, the controller may be configured to reduce an amount of power fed to the obtaining device corresponding to the reference information for which it is determined in the determination processing that the reference information cannot be referred to.

In the image processing apparatus, since the amount of power feeding to the obtaining device, for which it is determined that the corresponding reference information cannot be referred to, is reduced, it is possible to save the power consumption of the image processing apparatus.

The image processing apparatus may further comprise a notification unit, wherein in the case that the controller determines that the authentication information obtained from one obtaining device satisfies a predetermined condition, the controller may be configured to execute notification processing of notifying the notification unit that it is possible to execute the determination processing using the other obtaining device.

In the image processing apparatus, when the authentication information from one obtaining device satisfies the predetermined condition, the notification unit is notified that it is possible to determine whether it is possible to use the image processing unit by the other obtaining device. By the notification, the user can recognize that the other obtaining device can be used.

In the image processing apparatus, the predetermined condition may include a condition indicating that the controller determines that the authentication based on the authentication information obtained from the one obtaining device and the reference information corresponding to the one obtaining device is not successful so as not to grant the permission for executing the image processing by the image processing unit.

In the image processing apparatus, when the image processing unit is not permitted to be used on the basis of the corresponding reference information, with the authentication information from one obtaining device, it is notified to the notification unit. By the notification, the user can recognize that one obtaining device cannot be used.

In the image processing apparatus, the predetermined condition may include: a condition indicating that the controller determines that the authentication based on the authentication information obtained from the one obtaining device and each reference information of the first reference information and the second reference information is successful so as to grant the permission for executing the image processing by the image processing unit; and a condition indicating that an information amount of the authentication information obtainable from the other obtaining device is greater than an information amount of the authentication information obtainable from one obtaining device.

In the image processing apparatus, when it is possible to determine that the image processing unit is permitted to be used on the basis of each reference information of the first reference information and the second reference information and the information amount of the authentication information obtainable from the other obtaining device is greater than the information amount of the authentication information obtainable from one obtaining device, it is notified to the notification unit. By the notification, the user can recognize that it is possible to obtain the authentication information having the more information amount, i.e., the authentication information having higher performance by using the other obtaining device.

In the image processing apparatus, in the determination processing, the controller may be configured to, in response to determining that the authentication based on the authentication information obtained from one obtaining device and the reference information corresponding to the authentication information obtained from one obtaining device is not successful so as not to grant the permission for executing the image processing by the image processing unit, determine whether the permission for executing the image processing by the image processing unit can be granted by determining whether the authentication based on the authentication information obtained from the one obtaining device and the reference information corresponding to the other obtaining device is successful.

In the image processing apparatus, it is determined whether it is possible to use the image processing unit on the basis of the reference information corresponding to the other obtaining device, as it is determined that the image processing unit is not permitted to be used on the basis of the reference information corresponding to the authentication information obtained from one obtaining device. For this reason, even when the user wrongly enables one obtaining device to obtain the authentication information, since it is not necessary to again enable the other obtaining device to obtain the authentication information, it is possible to improve the convenience.

In the image processing apparatus, the controller may be configured to execute: type comparison processing of comparing a type of the authentication information obtainable from the internal obtaining device with a type of the authentication information obtainable from the external obtaining device; and in a case where it is determined in the type comparison processing that at least a part of types of the authentication information obtainable from the internal obtaining device can be obtained by the external obtaining device, selection processing of: selecting any one of the internal obtaining device and the external obtaining device as an obtaining source of a specific type of authentication information which is obtainable from both the internal obtaining device and the external obtaining device; and selecting the other obtaining device as a non-obtaining source of the specific type of authentication information such that the other obtaining device is configured not to accept the specific type of authentication information while being validated.

In the image processing apparatus, one obtaining device is selected as an obtaining source and the other obtaining device is selected as a non-obtaining source with respect to the specific type of authentication information obtainable from both the obtaining devices. For this reason, the processing of determining whether it is possible to use the image processing unit with respect to the specific type of authentication information from the other obtaining device is suppressed in the determination processing of the controller, so that it is possible to simplify the processing in the controller.

In the image processing apparatus, the controller may be configured to execute information amount comparison processing of comparing an information amount of the authentication information obtainable from the internal obtaining device with an information amount of the authentication information obtainable from the external obtaining device, and in the selection processing, the controller may be configured to select the obtaining device for which it is determined in the information amount comparison processing that the information amount thereof is greater, as the obtaining source.

In the image processing apparatus, since the obtaining device for which it is determined that the information amount of the obtainable authentication information is greater is selected as the obtaining source, it is possible to obtain the specific type of authentication information having higher performance.

According to another illustrative aspect of the present invention, there may be provided an image processing apparatus comprising: a first obtaining device configured to obtain a first authentication information; a communication device configured to communicate with a second obtaining device, wherein the second obtaining device is configured to obtain a second authentication information; an image processing unit configured to execute at least one of image reading and image formation; a storage unit configured to store a first reference information; a network interface configured to communicate with a server that is configured to store a second reference information; and a controller, wherein the controller is configured to: in a case that the controller receives the first authentication information via the first obtaining device, retrieve the first reference information from the storage unit and determine whether the first authentication information matches the first reference information; and in a case that the controller receives the second authentication information via the second obtaining device, retrieve the second reference information from the server via the network interface and determine whether the second authentication information matches the second reference information.

In the image processing apparatus, the controller may be further configured to: in a case that the controller determines that the first authentication information matches the first reference information, grant a permission for using the image processing unit and to control the image processing unit to execute at least one of the image reading and the image formation; in a case that the controller determines that the first authentication information does not match the first reference information, not to grant the permission for using the image processing unit; in a case that the controller determines that the second authentication information matches the second reference information, grant the permission for using the image processing unit and control the image processing unit to execute at least one of the image reading and the image formation; and in a case that the controller determines that the second authentication information does not match the second reference information, not to grant the permission for using the image processing unit.

According to the illustrative aspects of the present invention disclosed in the specification, it is possible to appropriately use the authentication information obtained from each of the obtaining devices in the image processing apparatus capable of obtaining the authentication information from the obtaining devices.

Illustrative Embodiments

A multi-function device 10 of a first illustrative embodiment will be described with reference to FIGS. 1 to 6.

As shown in FIG. 1, an image processing system of this illustrative embodiment includes the multi-function device 10, a terminal apparatus 40 and a server 51, which are connected through a communication line 50.

The multi-function device 10 is an example of the image processing apparatus and can execute a plurality of functions such as scan, copy and printing functions. The multi-function device 10 has a CPU 11, a ROM 12, a RAM 13, an NVRAM 14, an ASIC (Application Specific Integrated Circuit) 15, an operation unit 17, a display unit 18, a reading unit 19, an image forming unit 20, an internal authentication device 21, a connection interface (hereinafter, referred to as connection I/F) 24 and a network interface (hereinafter, referred to as network I/F) 25.

The ROM 12 is configured to store therein a variety of programs for controlling operations of the multi-function device 10. The various programs include programs for executing authentication device recognition processing, login processing and the like, which will be described later. In the NVRAM 14, internal user information 65 (refer to FIG. 4) is stored in advance. The CPU 11 is configured to control respective units of the multi-function device 10 in accordance with the programs read out from the ROM 12 while storing processing results in the RAM 13 and the NVRAM 14. As shown with a solid line 16 in FIG. 1, a part including the CPU 11, the ROM 12, the RAM 13, the NVRAM 14 and the ASIC 15 is an example of the controller.

The operation unit 17 has a plurality of buttons and can receive a variety of input instructions of a user. The display unit 18 has a liquid crystal monitor, a lamp and the like and can display various images under control of the CPU 11. The network I/F 25 is connected to the communication line 50, so that communication can be performed among the multi-function device 10, the terminal apparatus 40 and the server 51. The operation unit 17 and the network I/F 25 are examples of the input unit, and the display unit 18 is an example of the notification unit.

The reading unit 19 is configured to read an image on a reading document under control of the CPU 11 and to supply the generated image data to the terminal apparatus 40 and the like. The image forming unit 20 is configured to form an image on a sheet under control of the CPU 11, based on print data supplied from the terminal apparatus 40 and the like. The reading unit 19 and the image forming unit 20 are examples of the image processing unit.

The internal authentication device 21 is an authentication device embedded in the multi-function device 10, and is configured to obtain authentication information for determining whether it is possible to log in the multi-function device 10, i.e., whether it is possible to use at least one of the reading unit 19 and the image forming unit 20. The internal authentication device 21 has an obtaining unit 22. The obtaining unit 22 can obtain a specific type of authentication information. In this illustrative embodiment, the obtaining unit 22 can obtain a card ID recorded in an A-type IC card and a card ID recorded in a B-type IC card of cards (hereinafter, referred to as IC cards) having an IC chip therein. When the A-type IC card or B-type IC card is disposed at a predetermined reading position, the obtaining unit 22 reads the card ID recorded in the corresponding IC card and transmits the obtained card ID to the CPU 11. The internal authentication device 21 is an example of the internal obtaining device, and the card ID is an example of the authentication information.

The connection I/F 24 is an interface for performing communication with an external device by a wireless or wired communication method. In this illustrative embodiment, the connection I/F 24 is connected to an external authentication device 30 by a connection wiring 33 and is configured to perform communication with the external authentication device 30 by the wired communication method and to feed power to the external authentication device 30 through the connection wiring 33. The connection I/F 24 is an example of the communication unit.

The external authentication device 30 is an authentication device that can be externally mounted to the multi-function device 10, and is detachably connected to the connection I/F 24 of the multi-function device 10. The external authentication device 30 has a connection I/F 31 and an obtaining unit 32. The connection I/F 31 is connected to the connection wiring 33, so that the communication can be performed between the multi-function device 10 and the external authentication device 30 and the power can be fed from the multi-function device 10 to the external authentication device 30. The external authentication device 30 is an example of the external obtaining device.

The obtaining unit 32 can obtain a specific type of authentication information. In this illustrative embodiment, the obtaining unit 32 can obtain the card IDs recorded in the B-type IC card and a C-type IC card of the IC cards. When the B-type IC card or C-type IC card is disposed at a predetermined reading position, the obtaining unit 32 reads the card ID recorded in the corresponding IC card and transmits the obtained card ID to the CPU 11.

The CPU 11 is configured to set and store user information by associating the card ID read by the authentication devices 21, 30 with a user name and a password input from the operation unit 17. In this illustrative embodiment, the CPU 11 is configured to store the internal user information 65, which is set using the internal authentication device 21, in the NVRAM 14 and to store external user information 75, which is set using the external authentication device 30, in the server 51. In login processing that will be described later, the CPU 11 is configured to compare the card ID obtained by the internal authentication device 21 with the corresponding internal user information 65 and to thus determine whether it is possible to log in the multi-function device 10 and is also configured to compare the card ID obtained by the external authentication device 30 with the corresponding external user information 75 and to thus determine whether it is possible to log in the multi-function device 10. The internal user information 65 is an example of the first reference information and the external user information 75 is an example of the second reference information.

The user information 65, 75 can be displayed and read on the display unit 18 and can also be read from the terminal apparatus 40. Specifically, as shown in FIG. 4, a setting screen 60 including the user information 65, 75 can be displayed on the display unit 18. Also, the setting screen 60 including the internal user information 65 can be displayed on a display unit (not shown) of the terminal apparatus 40, in response to a request from the terminal apparatus 40.

As shown in FIG. 4, in this illustrative embodiment, a card ID of an eight-digit number of the A-type IC card or B-type IC card can be obtained from the internal authentication device 21, and a card ID of a sixteen-digit number of the B-type IC card or C-type IC card can be obtained from the external authentication device 30. That is, the card ID of the B-type IC card can be obtained by both the authentication devices of the internal authentication device 21 and the external authentication device 30, but a number of digits of the card IDs obtained by the authentication devices is different depending on the authentication device. In the user information 65, 75, at least one card ID of the eight-digit number and sixteen-digit number is set for each user name, and a check box corresponding to the set card ID is checked. The number of digits of the card ID is an example of the information amount of the authentication information.

On the setting screen 60, authentication device setting information 61 is displayed, in addition to the user information 65, 75. The authentication device setting information 61 includes authentication information state information 62 and authentication card type information 63. Regarding the authentication device state information 62, a state indicating whether an authentication device is valid or invalid, which is determined by authentication device recognition processing that will be described later, and an address indicating a location of the corresponding user information are displayed.

In this illustrative embodiment, 'valid' means a state where the power is being fed, and 'invalid' means a state where the power feeding is stopped. For this reason, in the multi-function device 10, a card ID is obtained from a validated authentication device and a card ID is not obtained from an invalidated authentication device. In this illustrative embodiment, the internal authentication device 21 is set to the valid state all the time, and the external authentication device 30 is switched between the valid and invalid states, depending on the connection to the connection I/F 24, and the like.

Regarding the authentication card type information 63, the types of the IC cards that can be obtained by the respective authentication devices 21, 30 are described. More specifically, the authentication card type information 63 shows a list of the types of the IC cards that can be obtained by the respective authentication devices 21, 30. In the authentication card type information 63, a check box adjacent to a type of an IC card, which is set as an authentication target in the respective internal authentication devices 21, 30 by the authentication device recognition processing (which will be described later), is checked.

Figure 2:
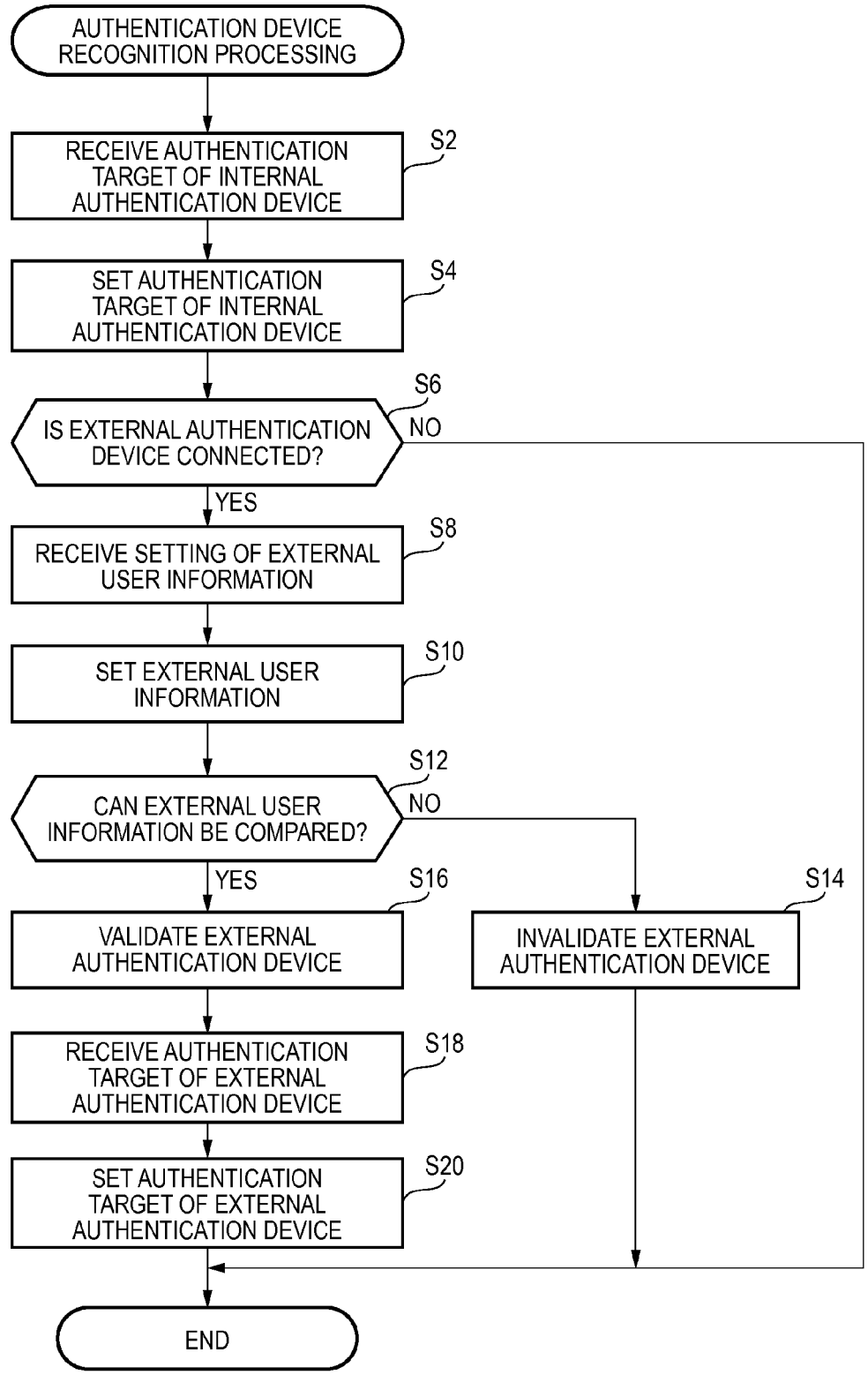
FIG. 2 is a flowchart showing authentication device recognition processing.

In the below, the authentication device recognition processing and login processing that are executed by the CPU 11 of the multi-function device 10 are described with reference to FIGS. 2 to 6. The authentication device recognition processing is executed every predetermined time while the multi-function device 10 is at an on state. As shown in FIG. 2, when the authentication device recognition processing starts, the CPU 11 first receives a selection of a type of an IC card, which is set as an authentication target for the internal authentication device 21 (S2). In response to receiving the selection of the type of the IC card through the operation unit 17 or from the terminal apparatus 40 via the network I/F 25, the CPU 11 sets the selection content in the authentication card type information 63 (S4). In this illustrative embodiment, as shown in FIG. 4, the A-type IC card of the A-type IC card and the B-type IC card obtainable from the internal authentication device 21 is set as the IC card of the authentication target.

Subsequently, the CPU 11 determines whether the external authentication device 30 is connected (S6). When the external authentication device 30 is connected to the connection I/F 24, the CPU 11 feeds the power to the external authentication device 30 and then inquires of the external authentication device 30 for a model number, information of a type of an IC card obtainable from the external authentication device 30, and the like. When there is a reply from the external authentication device 30, in response to the inquiry of the external authentication device 30, the CPU 11 determines that the external authentication device 30 is connected. On the other hand, when there is no reply from the external authentication device 30 in spite of the inquiry of the external authentication device 30, the CPU 11 determines that the external authentication device 30 is not connected.

When it is determined that the external authentication device 30 is not connected (S6: NO), the CPU 11 ends the authentication device recognition processing. On the other hand, when it is determined that the external authentication device 30 is connected (S6: YES), the CPU 11 receives the setting of the external user information 75 corresponding to the external authentication device 30 (S8). Specifically, the CPU 11 receives an address of the server 51 stored in the external user information 75, and when the address is received, the CPU 11 sets the corresponding address in the authentication device state information 62 (S10).

Subsequently, the CPU 11 determines whether the set external user information 75 can be compared (S12). Specifically, the CPU 11 inquires of the server 51 in which the external user information 75 is stored. When there is a reply from the server 51, in response to the inquiry, the CPU 11 determines that the external user information 75 can be compared. On the other hand, when there is no reply from the server 51, in spite of the inquiry of the server 51, the CPU 11 determines that the external user information 75 cannot be compared.

When it is determined that the external user information 75 cannot be compared (S12: NO), the CPU 11 stops the power feeding to the external authentication device 30 through the connection I/F 24, thereby invalidating the external authentication device 30 (S14) and ending the authentication device recognition processing. The CPU 11 invalidates the external authentication device 30 to disable the card ID from being transmitted from the external authentication device 30. On the other hand, when it is determined that the external user information 75 can be compared (S12: YES), the CPU 11 continues to feed the power to the external authentication device 30 through the connection I/F 24, thereby validating the external authentication device 30 (S16).

After validating the external authentication device 30, the CPU 11 receives a selection of a type of an IC card, which is set as an authentication target for the external authentication device 30 (S18). In response to receiving the selection of a type of an IC card through the operation unit 17 or from the terminal apparatus 40 via the network I/F 25, the CPU 11 sets the selection content in the authentication card type information 63 (S20) and ends the authentication device recognition processing. In this illustrative embodiment, as shown in FIG. 4, both the B-type IC card and the C-type IC card obtainable from the external authentication device 30 are set as the IC card of the authentication target.

Figure 3:
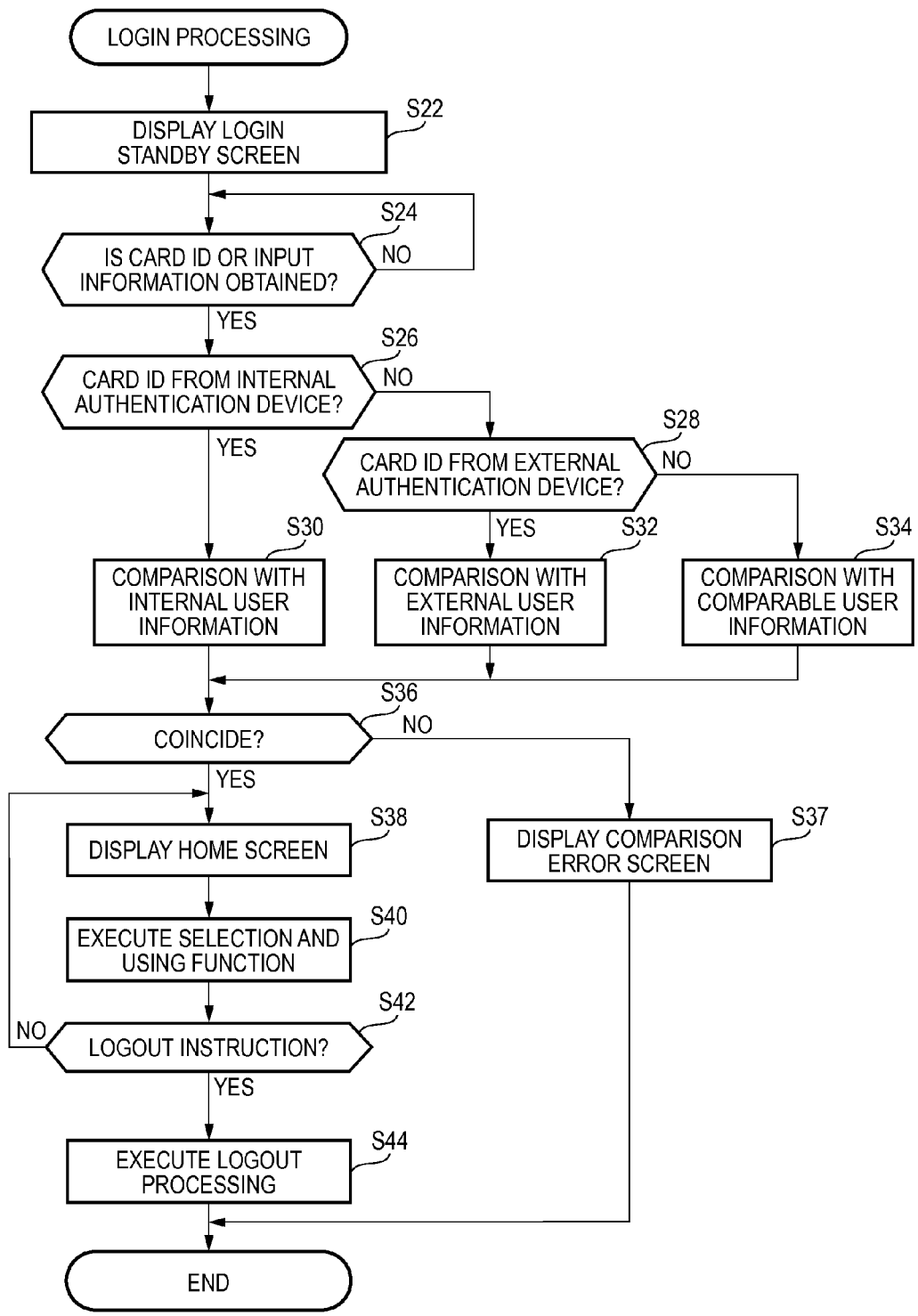
FIG. 3 is a flowchart showing login processing.
Figure 5:
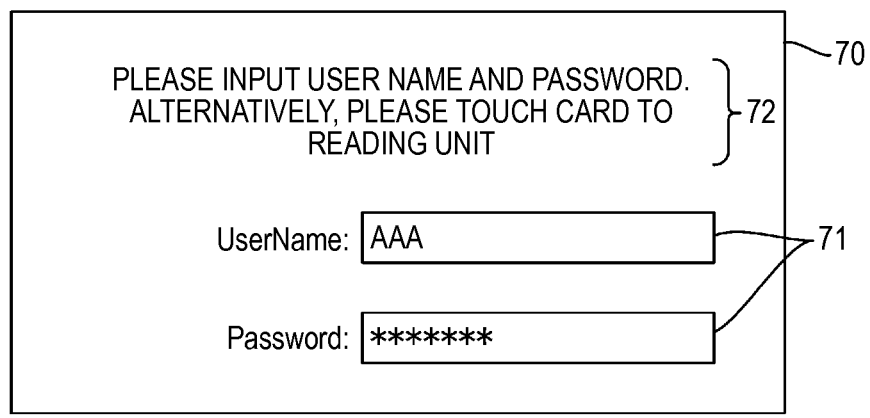
FIG. 5 illustrates a login standby screen.
Figure 6:
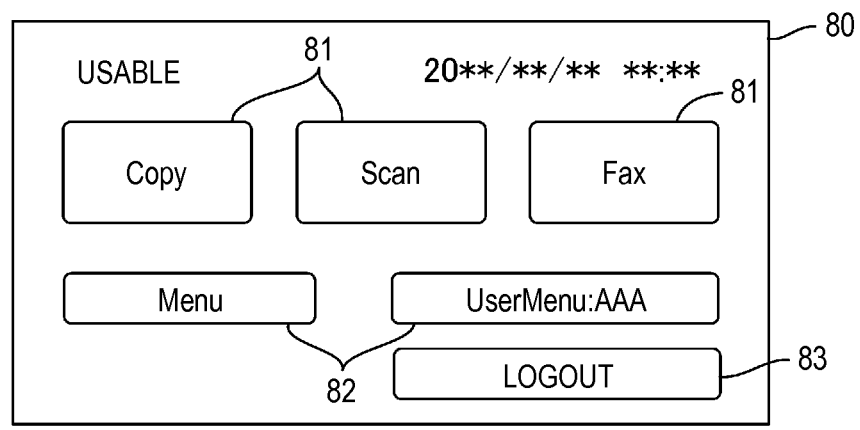
FIG. 6 illustrates a home screen.

Subsequently, the login processing is described. The login processing is executed when a user input operation is performed through the operation unit 17 or is received from the terminal apparatus 40 via the network I/F 25. As shown in FIG. 3, when the login processing starts, the CPU 11 first displays a login standby screen 70 on the display unit 18 (S22). As shown in FIG. 5, the login standby screen 70 is provided with input columns 71 in which a user name and a password can be input. In addition, a message 72 indicating that the authentication devices 21, 30 can be used without inputting a user name and a password is displayed.

After displaying the login standby screen 70, the CPU 11 waits for obtaining of the card ID from the authentication devices 21, 30 or user input in the input columns 71 (S24: NO). When the card ID is obtained from the authentication devices 21, 30 or the user name and password are input in the input columns 71 by the user (S24: YES), the CPU 11 compares the obtained information with the user information 65, 75.

Specifically, the CPU 11 determines an obtaining source of the obtained information (S26, S28). When the obtained information is the card ID obtained from the internal authentication device 21 (S26: YES), the CPU 11 compares the obtained card ID with the corresponding internal user information 65 (S30). Also, when the obtained information is the card ID obtained from the external authentication device 30 (S26: NO, S28: YES), the CPU 11 compares the obtained card ID with the corresponding external user information 75 (S32). Also, when the obtained information is the input information input from the operation unit 17 or terminal apparatus 40 (S26: NO, S28: NO), the CPU 11 compares the input information with the comparable user information of the user information 65, 75 (S34).

The CPU 11 determines whether the obtained card ID or input information input in the input columns 71 coincides with the user information 65, 75 (S36) so as to determine whether it is possible to log in the multi-function device 10. For example, in a case where the obtained card ID or input information input in the input columns 71 does not coincide with the user information 65, 75 (S36: NO), the CPU 11 does not permit the login to the multi-function device 10, displays a comparison error screen on the display unit 18 (S37) and ends the login processing.

On the other hand, in a case where the obtained card ID or input information input in the input columns 71 coincides with the user information 65, 75 (S36: YES), the CPU 11 permits the login to the multi-function device 10, switches the multi-function device 10 to a state where the reading unit 19 and the image forming unit 20 can be used, and displays a home screen 80 shown in FIG. 6 on the display unit 18 (S38).

After displaying the home screen 80, the CPU 11 executes following processing, as a selection and using function (S40). The home screen 80 is provided with function buttons 81 on which functions of using at least one of the reading unit 19 and the image forming unit 20 are described, such as 'Copy', 'Scan', 'Fax' and the like. When one of the function buttons 81 is selected by the user, the CPU 11 executes a function relating to the selected button.

Also, the home screen 80 is provided with setting buttons 82 for performing a variety of settings such as 'Menu', 'User-Menu' and the like. When one of the setting buttons 81 is selected by the user, the CPU 11 displays the setting screen 60 on the display unit 18. Thereby, the user can execute an update setting of the user information 65 by using the displayed setting screen 60, for example.

Further, the home screen 80 is provided with a logout button 83 for logout from the multi-function device 10. The CPU 11 determines whether the logout button 83 is selected by the user and a logout instruction is thus input (S42). When the logout instruction is not input (S42: NO), the CPU 11 repeats the processing from S38. On the other hand, when the logout instruction is input (S42: YES), the CPU 11 performs logout processing (S44).

In the above illustrative embodiment, the CPU 11 is configured to compare the card ID obtained by the internal authentication device 21 with the internal user information 65 and to determine whether it is possible to log in the multi-function device 10 and is also configured to compare the card ID obtained by the external authentication device 30 with the external user information 75 and to determine whether it is possible to log in the multi-function device 10. Thereby, it is possible to appropriately use the card IDs, which are respectively obtained from the internal authentication device 21 and the external authentication device 30, by the user information.

In the above illustrative embodiment, the CPU 11 is configured to set the external user information 75 on the basis of the user input received from the operation unit 17 or terminal apparatus 40 via the network I/F 25. Therefore, it is possible to set the external user information 75 in accordance with the user's intention.

In the above illustrative embodiment, the external user information 75 is stored in the server 51 external to the multi-function device 10. If the external user information 75 is stored in the NVRAM 14 of the multi-function device 10, it is necessary to secure a capacity for storing the external user information 75 in the NVRAM 14 in advance. However, when the external authentication device 30 is not connected, the capacity cannot be effectively utilized. In this illustrative embodiment, since the external user information 75 is stored at the outside of the multi-function device 10, it is possible to effectively utilize the NVRAM 14.

In the above illustrative embodiment, the CPU 11 is configured to determine whether the set external user information 75 can be compared. When it is determined that the external user information 75 cannot be compared, the CPU 11 stops the power feeding to the external authentication device 30, thereby disabling the card ID from being transmitted from the external authentication device 30. Thereby, it is possible to save the power consumption of the multi-function device 10 and to suppress the login processing from being executed for the card ID obtained from the external authentication device 30, so that it is possible to simplify the processing in the CPU 11.

In the above illustrative embodiment, the CPU 11 is configured to set the type of the IC card, which is set as an authentication target for the respective authentication devices 21, 30, on the basis of the user input received from the operation unit 17 or terminal apparatus 40 via the network I/F 25. Thereby, it is possible to appropriately use the card IDs, which are respectively obtained from the internal authentication device 21 and the external authentication device 30, by the user input.

Figure 7:
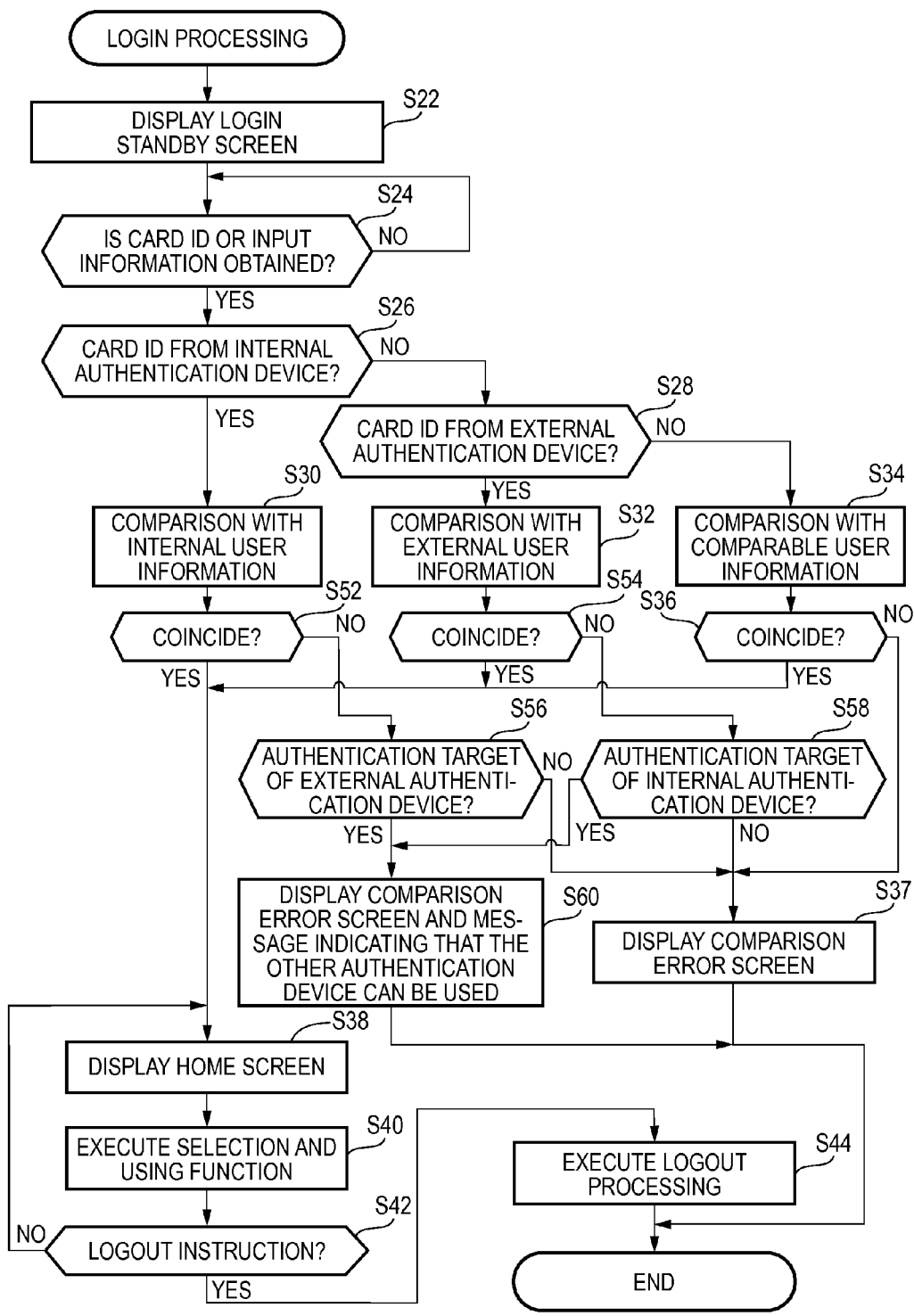
FIG. 7 is a flowchart showing login processing according to a second illustrative embodiment.

The multi-function device 10 according to a second illustrative embodiment will be described with reference to FIG. 7. The multi-function device 10 of this illustrative embodiment is different from the multi-function device 10 of the above illustrative embodiment, in that when the card ID obtained from one authentication device does not coincide with the corresponding user information, it is determined whether the card ID can be compared with the user information corresponding to the other authentication device, in the login processing.

In this illustrative embodiment, the A-type IC card and the B-type IC card are set as the IC card of the authentication target for the internal authentication device 21, and the B-type IC card and the C-type IC card are set as the IC card of the authentication target for the external authentication device 30. That is, the B-type IC card is set as the IC card of the authentication target for both authentication devices of the internal authentication device 21 and the external authentication device 30. In the below, the overlapping descriptions with the above illustrative embodiment are omitted.

In the below, the login processing of this illustrative embodiment is described with reference to FIG. 7. As shown in FIG. 7, the CPU 11 starts the login processing. Then, when a card ID is obtained from the internal authentication device 21, the CPU 11 compares the obtained card ID with the corresponding internal user information 65 (S30). Also, when a card ID is obtained from the external authentication device 30, the CPU 11 compares the obtained card ID with the corresponding external user information 75 (S32). When the card IDs obtained from the respective authentication devices coincide with the corresponding user information (S52: YES, S54: YES), the CPU 11 permits the login to the multi-function device 10 and executes processing from S38.

On the other hand, when the card IDs obtained from the respective authentication devices do not coincide with the corresponding user information (S52: NO, S54: NO), i.e., when the login to the multi-function device 10 cannot be permitted with the corresponding user information, the CPU 11 does not permit the login to the multi-function device 10 and determines whether the corresponding card ID can permit the login to the multi-function device 10 by the other authentication device (S56, S58).

Specifically, when the card ID obtained from the internal authentication device 21 does not coincide with the corresponding internal user information 65 (S52: NO), the CPU 11 determines whether the type of the IC card, from which the card ID is obtained, is an authentication target of the external authentication device 30 (S56). When the type of the IC card is the A-type IC card and is not an authentication target of the external authentication device 30 (S56: NO), the CPU 11 displays a comparison error screen on the display unit 18 (S37) and ends the login processing.

On the other hand, when the type of the IC card is the B-type IC card and is an authentication target of the external authentication device 30 (S56: YES), the CPU 11 displays a comparison error screen on the display unit 18, displays a message indicating that the external authentication device 30 can be used (S60), and then ends the login processing.

Likewise, when the card ID obtained from the external authentication device 30 does not coincide with the corresponding external user information 75 (S54: NO), the CPU 11 determines whether the type of the IC card, from which the card ID is obtained, is an authentication target of the internal authentication device 21 (S58). When the type of the IC card is the C-type IC card and is not an authentication target of the internal authentication device 21 (S58: NO), the CPU 11 displays a comparison error screen on the display unit 18 (S37) and ends the login processing.

On the other hand, when the type of the IC card is the B-type IC card and is an IC card of an authentication target of the internal authentication device 21 (S56: YES), the CPU 11 displays a comparison error screen on the display unit 18, displays a message indicating that the internal authentication device 21 can be used (S60), and then ends the login processing.

In the above illustrative embodiment, when the card ID obtained from the one authentication device does not coincide with the corresponding user information, the message indicating that the reading by the other authentication device can be performed is displayed on the display unit 18. By the display, the user of the multi-function device 10 can recognize that the one authentication device cannot be used and the other authentication device can be used.

Figure 8:
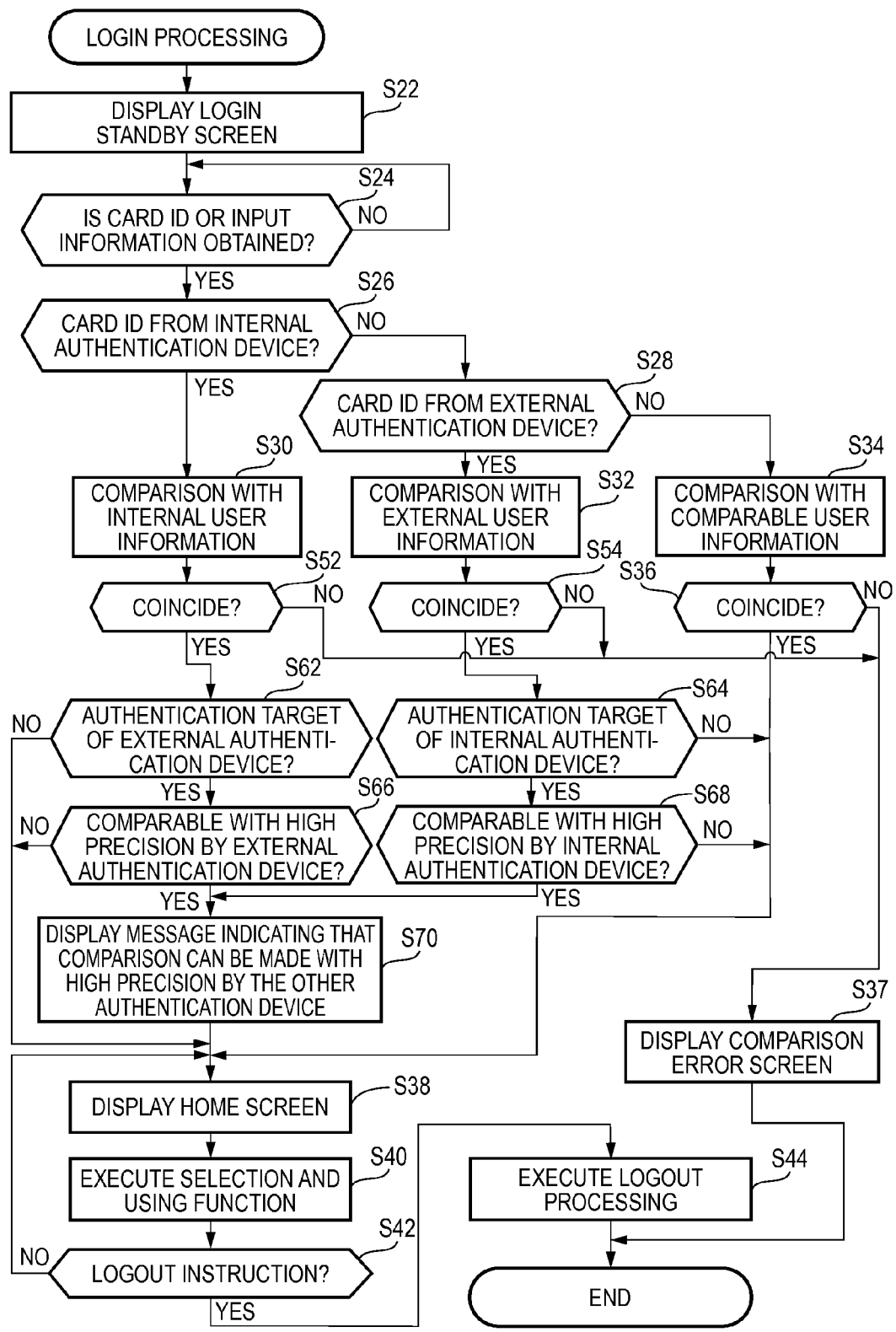
FIG. 8 is a flowchart showing login processing according to a third illustrative embodiment.

The multi-function device 10 according to a third illustrative embodiment will be described with reference to FIG. 8. The multi-function device 10 of this illustrative embodiment is different from the multi-function device 10 of the above illustrative embodiment, in that it is determined whether the card ID obtained from one authentication device can be compared with high precision by comparing the card ID with any of the user information corresponding to one authentication device and the user information corresponding to the other authentication device, in the login processing.

In this illustrative embodiment, the A-type IC card and the B-type IC card are set as the IC card of the authentication target for the internal authentication device 21 and the B-type IC card and the C-type IC card are set as the IC card of the authentication target for the external authentication device 30. That is, the B-type IC card is set as the IC card of the authentication target for both the authentication devices of the internal authentication device 21 and the external authentication device 30. Also, the card ID is obtained from the external authentication device 30, so that it is possible to obtain the card ID having the more number of digits, i.e., the card ID having the greater information amount, as compared to the configuration where the card ID is obtained from the internal authentication device 21. In the below, the overlapping descriptions with the above illustrative embodiment are omitted.

In the below, the login processing of this illustrative embodiment is described with reference to FIG. 8. As shown in FIG. 8, the CPU 11 starts the login processing. Then, when a card ID is obtained from the internal authentication device 21, the CPU 11 compares the obtained card ID with the corresponding internal user information 65 (S30). Also, when a card ID is obtained from the external authentication device 30, the CPU 11 compares the obtained card ID with the corresponding external user information 75 (S32). When the card IDs obtained from the respective authentication devices do not coincide with the corresponding user information (S52: NO, S54: NO), the CPU 11 does not permit the login to the multi-function device 10, displays a comparison error screen on the display unit 18 (S37) and ends the login processing.

On the other hand, when the card IDs obtained from the respective authentication devices coincide with the corresponding user information (S52: YES, S54: YES), i.e., when the login to the multi-function device 10 is permitted, the CPU 11 determines whether the corresponding card ID can permit the login to the multi-function device 10 by the other authentication device (S62, S64).

Specifically, when the card ID obtained from the internal authentication device 21 coincides with the corresponding internal user information 65 (S52: YES), the CPU 11 determines whether the type of the IC card, from which the card ID is obtained, is an authentication target of the external authentication device 30 (S62). When the type of the IC card is the A-type IC card and is not an authentication target of the external authentication device 30 (S62: NO), the CPU 11 executes the processing from S38.

On the other hand, when the type of the IC card is the B-type IC card and is an authentication target of the external authentication device 30 (S62: YES), the CPU 11 further determines whether the corresponding card ID can be compared with high precision by the external authentication device 30 (S66).

Specifically, the CPU 11 compares the number of digits of the card ID obtainable from the external authentication device 30 with the number of digits of the card ID obtainable from the internal authentication device 21. When the number of digits of the card ID obtainable from the external authentication device 30 is larger than the number of digits of the card ID obtainable from the internal authentication device 21 (S66: YES), the CPU 11 displays a message, which indicates that the comparison can be made with high precision by using the external authentication device 30, on the display unit 18 (S70) and executes the processing from S38. In this illustrative embodiment, since the number of digits of the card ID obtainable from the external authentication device 30 is larger than the number of digits of the card ID obtainable from the internal authentication device 21, 'YES' is determined in the processing of S66.

On the other hand, when the number of digits of the card ID obtainable from the external authentication device 30 is equal to or smaller than the number of digits of the card ID obtainable from the internal authentication device 21 (S66: NO), the CPU 11 executes the processing from S38 without performing the above display at S70.

Likewise, when the card ID obtained from the external authentication device 30 coincides with the corresponding external user information 75 (S54: YES), the CPU 11 determines whether the type of the IC card, from which the card ID is obtained, is an authentication target of the internal authentication device 21 (S64). When the type of the IC card is the C-type IC card and is not an authentication target of the internal authentication device 21 (S64: NO), the CPU 11 executes the processing from S38.

On the other hand, when the type of the IC card is the B-type IC card and is an authentication target of the external authentication device 30 and the internal authentication device 21 (S64: YES), the CPU 11 further determines whether the IC card can be compared with high precision by the internal authentication device 21 (S68).

Specifically, the CPU 11 compares the number of digits of the card ID obtainable from the internal authentication device 21 with the number of digits of the card ID obtainable from the external authentication device 30. When the number of digits of the card ID obtainable from the internal authentication device 21 is larger than the number of digits of the card ID obtainable from the external authentication device 30 (S68: YES), the CPU 11 displays a message, which indicates that the comparison can be made with high precision by using the internal authentication device 21, on the display unit 18 (S70) and executes the processing from S38.

On the other hand, when the number of digits of the card ID obtainable from the internal authentication device 21 is equal to or smaller than the number of digits of the card ID obtainable from the external authentication device 30 (S68: NO), the CPU 11 executes the processing from S38 without performing the above display. In this illustrative embodiment, since the number of digits of the card ID obtainable from the internal authentication device 21 is equal to or smaller than the number of digits of the card ID obtainable from the external authentication device 30, 'NO' is determined in the processing of S68.

In the above illustrative embodiment, when the type of the IC card, from which the card ID is obtained from one authentication device, is the authentication target of both the authentication devices 21, 30, the number of digits of the card IDs obtainable from the respective authentication devices is compared. When the card ID having the greater number of digits can be obtained from the other authentication device, the message indicating that the comparison can be made with high precision by using the other authentication device is displayed on the display unit 18. By the display, when the user of the multi-function device 10 wants the comparison of high precision, the user can recognize that the other authentication device can be used.

Figure 9:
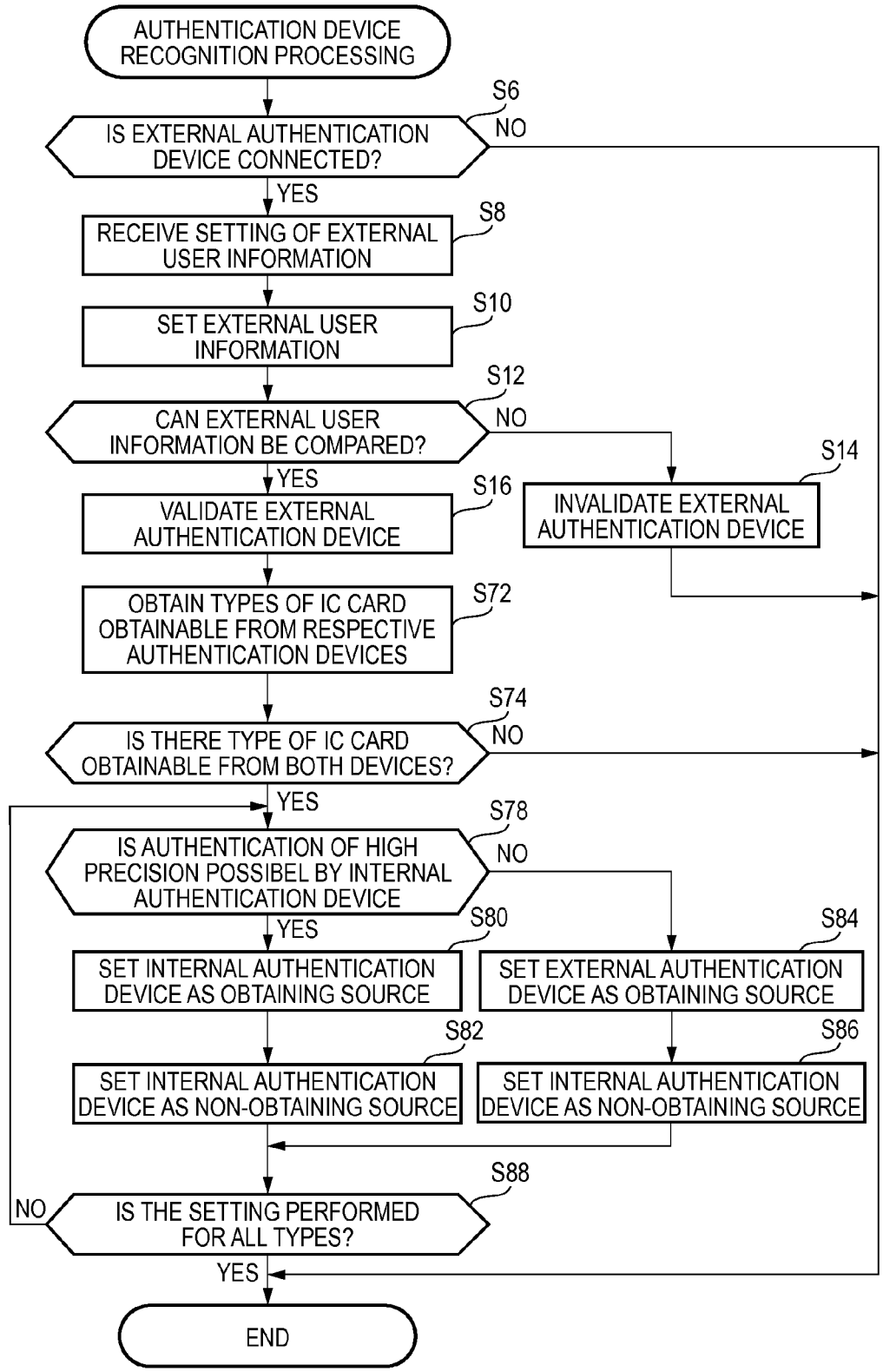
FIG. 9 is a flowchart showing authentication device recognition processing according to a fourth illustrative embodiment.
Figure 10:
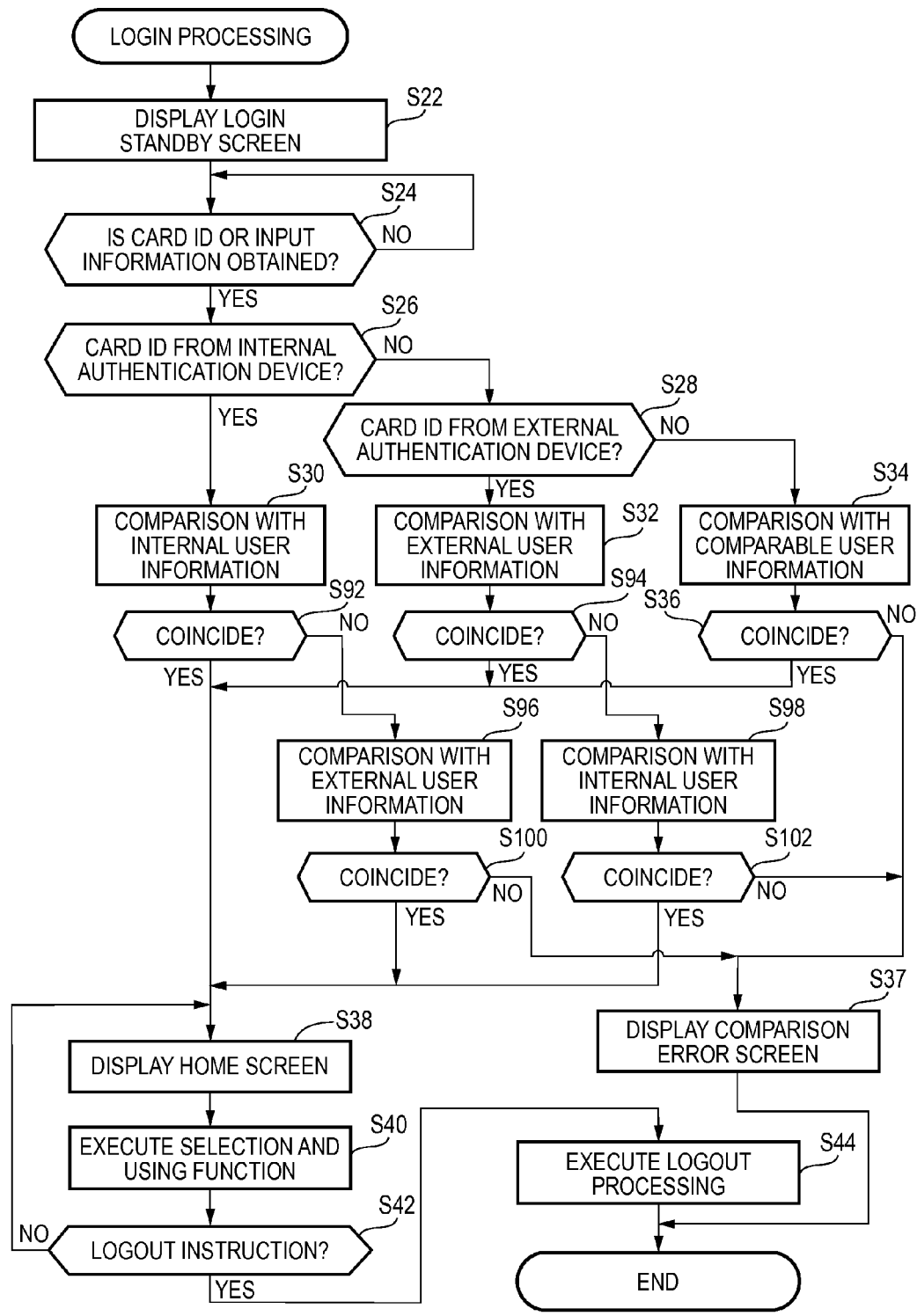
FIG. 10 is a flowchart showing login processing according to the fourth illustrative embodiment.

The multi-function device 10 according to a fourth illustrative embodiment will be described with reference to FIGS. 9 and 10. The multi-function device 10 of this illustrative embodiment is different from the multi-function device 10 of the above illustrative embodiment, in that in the authentication device recognition processing, the type of the IC card, which is set as an authentication target for each authentication device, is selected from the apparatus other than the user, and in the login processing, when the card ID obtained from one authentication device does not coincide with the corresponding user information, the obtained card ID is compared to the user information corresponding to the other authentication device.

Incidentally, in this illustrative embodiment, the processing of receiving the selection of the type of the IC card, which is set as an authentication target for each authentication device 21, from the user is not executed. In the below, the overlapping descriptions with the above illustrative embodiment are omitted.

In the below, the authentication device recognition processing of this illustrative embodiment is described with reference to FIG. 9. As shown in FIG. 9, the CPU 11 starts the authentication device recognition processing. Then, when the CPU 11 validates the external authentication device 30, the CPU 11 obtains types of the IC card, which can be obtained from the respective authentication devices, from the authentication card type information 63 (S72). Then, the CPU 11 determines whether there is a type of the IC card obtainable from both the authentication devices of the internal authentication device 21 and the external authentication device 30 (S74). When there is no type of the IC card that can be obtained from both the authentication devices (S74: NO), the CPU 11 ends the authentication device recognition processing.

On the other hand, when there is a type of the IC card that can be obtained from both the authentication devices (S74: YES), the CPU 11 further executes processing from S78 for each type of the IC card. In this illustrative embodiment, since the B-type IC card can be obtained from both the authentication devices of the internal authentication device 21 and the external authentication device 30, 'YES' is determined in the processing of S74. The B-type IC card is an example of the specific type of authentication information.

The CPU 11 first obtains one type from the types of the IC card, which can be obtained from both the authentication devices, and determines whether the selected type of the IC card can be compared with high precision by the internal authentication device 21 (S78).

Specifically, the CPU 11 compares the number of digits of the card ID obtainable from the internal authentication device 21 with the number of digits of the card ID obtainable from the external authentication device 30. When the number of digits of the card ID obtainable from the internal authentication device 21 is larger than the number of digits of the card ID obtainable from the external authentication device 30 (S78: YES), the CPU 11 sets the selected type of the IC card as an authentication target of the internal authentication device 21 (S80) and as a non-authentication target of the external authentication device 30 (S82). That is, the CPU 11 sets the internal authentication device 21 as an 'obtaining source' of the selected type of the IC card and sets the external authentication device 30 as a 'non-obtaining source' of the selected type of the IC card. Herein, the CPU 11 validates both of the internal authentication device 21 and the external authentication device 30 by supplying with the power, the CPU11 obtains the card ID from the internal authentication device 21 which is selected as the 'obtaining source', and the CPU11 does not obtain the card ID from the external authentication device 30 which is selected as the 'non-obtaining source'.

On the other hand, when the number of digits of the card ID obtainable from the internal authentication device 21 is equal to or smaller than the number of digits of the card ID obtainable from the external authentication device 30 (S78: NO), the CPU 11 sets the selected type of the IC card as an authentication target of the external authentication device 30 (S84) and as a non-authentication target of the internal authentication device 21 (S86). That is, the CPU 11 sets the external authentication device 30 as an 'obtaining source' of the selected type of the IC card and sets the internal authentication device 21 as a 'non-obtaining source' of the selected type of the IC card. In this illustrative embodiment, since the number of digits of the card ID obtainable from the external authentication device 30 is larger than the number of digits of the card ID obtainable from the internal authentication device 21, 'NO' is determined in the processing of S78, the external authentication device 30 is set as an 'obtaining source' and the internal authentication device 21 is set as a 'non-obtaining source.' Herein, the CPU 11 validates both of the internal authentication device 21 and the external authentication device 30 by supplying with the power, the CPU11 obtains the card ID from the internal authentication device 21 which is selected as the 'obtaining source', and the CPU11 does not obtain the card ID from the external authentication device 30 which is selected as the 'non-obtaining source'.

The CPU 11 determines whether the above-described setting is performed for all the types of the IC card that can be obtained from both the authentication devices (S88). When there remains a type of the IC card for which the setting is not performed (S88: NO), the CPU 11 repeats the processing from S78. On the other hand, when the setting is performed for all the types of the IC card (S88: YES), the CPU 11 ends the authentication device recognition processing.

In the below, the login processing of this illustrative embodiment is described with reference to FIG. 10. As shown in FIG. 10, the CPU 11 starts the login processing. Then, when a card ID is obtained from the internal authentication device 21, the CPU 11 compares the obtained card ID with the corresponding internal user information 65 (S30). Also, when a card ID is obtained from the external authentication device 30, the CPU 11 compares the obtained card ID with the corresponding external user information 75 (S32). When the card IDs obtained from the respective authentication devices coincide with the corresponding user information (S92: YES, S94: YES), the CPU 11 permits the login to the multi-function device 10 and executes processing from S38.

On the other hand, when the card IDs obtained from the respective authentication devices do not coincide with the corresponding user information (S92: NO, S94: NO), i.e., when the login to the multi-function device 10 cannot be permitted with the corresponding user information, the CPU 11 compares the corresponding card ID with the user information corresponding to the other authentication device (S96, S98).

Specifically, when the card ID obtained from the internal authentication device 21 does not coincide with the corresponding internal user information 65 (S92: NO), the CPU 11 compares the corresponding card ID with the external user information 75 (S96). When the card ID obtained from the internal authentication device 21 coincides with the external user information 75 (S100: YES), the CPU 11 permits the login to the multi-function device 10 and executes the processing from S38. Also, when the card ID obtained from the internal authentication device 21 does not coincide with the external user information 75 (S100: NO), the CPU 11 does not permit the login to the multi-function device 10, displays a comparison error screen on the display unit 18 (S37) and ends the login processing.

Likewise, when the card ID obtained from the external authentication device 30 does not coincide with the corresponding external user information 75 (S94: NO), the CPU 11 compares the corresponding card ID with the internal user information 65 (S98). When the card ID obtained from the external authentication device 30 coincides with the internal user information 65 (S102: YES), the CPU 11 permits the login to the multi-function device 10 and executes the processing from S38. Also, when the card ID obtained from the internal authentication device 21 does not coincide with the external user information 75 (S102: NO), the CPU 11 does not permit the login to the multi-function device 10, displays a comparison error screen on the display unit 18 (S37) and ends the login processing.

In the above illustrative embodiment, the CPU 11 sets one authentication device as an obtaining source and sets the other authentication device as a non-obtaining source with respect to the type of the IC card obtainable from both the authentication devices. For this reason, regarding the type of the IC card obtainable from both the authentication devices, it is possible to suppress the login processing from being executed with the card ID obtained from both the authentication devices, so that it is possible to simplify the processing in the CPU 11.

In the above illustrative embodiment, when setting the authentication device of the obtaining source with respect to the type of the IC card obtainable from both the authentication devices, the authentication device for which it is determined that the number of digits of the obtainable card ID is larger is set as the authentication device of the obtaining source. For this reason, it is possible to compare the card ID with high precision by using the authentication device set as the obtaining source.

In the above illustrative embodiment, when the card ID obtained from one authentication device does not coincide with the corresponding user information, the corresponding card ID is compared to the user information corresponding to the other authentication device. For this reason, even when the user of the multi-function device 10 selects a wrong authentication device for reading the IC card, since it is not necessary to enable the other authentication device to read the corresponding IC card, it is possible to improve the user's convenience.

Incidentally, in the specification, a following configuration is disclosed with respect to the illustrative embodiments:

(1) An image processing apparatus comprising:
an internal obtaining device configured to obtain authentication information;
a communication unit configured to perform communication with an external obtaining device that is configured to obtain authentication information;
an image processing unit configured to execute at least one of image reading and image formation;
an input unit; and
a controller,
wherein the controller is configured to execute:
allotment processing of allotting authentication information, which is set as a target for the internal obtaining device, and authentication information, which is set as a target for the external obtaining device, on the basis of an input from the input unit; and
determination processing of determining whether it is possible to use the image processing unit, on the basis of the allotment of the allotment processing.

The image processing apparatus is configured to determine whether it is possible to use the image processing unit, based on a type of the authentication information set by the input from the input unit. Thereby, it is possible to appropriately use the authentication information, which is obtained from each of a plurality of obtaining devices, in accordance with the input from the input unit.

Also, in the specification, a following configuration is disclosed with respect to the illustrative embodiments:

(2) An image processing apparatus including:
an internal obtaining device configured to obtain authentication information;
a communication unit configured to perform communication with an external obtaining device that is configured to obtain authentication information;
an image processing unit configured to execute at least one of image reading and image formation; and
a controller,
wherein the controller is configured to execute:
type comparison processing of comparing a type of authentication information obtainable from the internal obtaining device with a type of authentication information obtainable from the external obtaining device,
in a case where it is determined in the type comparison processing that at least a part of types of the authentication information obtainable from the internal obtaining device can be obtained by the external obtaining device, selection processing comprising:
selecting any one of the internal obtaining device and the external obtaining device as an obtaining source of a specific type of authentication information which is obtainable from both the internal obtaining device and the external obtaining device; and
selecting the other obtaining device as a non-obtaining source of the specific type of authentication information such that the other obtaining device is configured not to receive the authentication information while being validated, and determination processing comprising:

determining whether it is possible to use the image processing unit with respect to the specific type of authentication information from the obtaining device selected as the obtaining source in the selection processing; and not to perform determination whether it is possible to use the image processing unit with respect to the specific type of authentication information from the obtaining device selected as the non-obtaining source in the selection processing.

The image processing apparatus is configured to select one obtaining device as an obtaining source and the other obtaining device as a non-obtaining source with respect to the specific type of authentication information obtainable from both the obtaining devices. For this reason, the processing of determining whether it is possible to use the image processing unit with respect to the specific type of authentication information from the other obtaining device is suppressed in the determination processing of the controller, so that it is possible to simplify the processing in the controller.

The technology disclosed in the specification is not limited to the above illustrative embodiments described and shown in the above descriptions and drawings and include following various aspects, for example.

The 'image processing apparatus' is not limited to the multi-function device, and may be an image reading apparatus having only a scan function and an image forming apparatus having only a printing function, for example.

The 'obtaining device' is not limited to the card authentication type device configured to obtain the card ID recorded in the IC card, and may be a biometric authentication type device such as fingerprint, retina and vein. In case of the biometric authentication type device, the 'authentication information' may be a fingerprint image, a capillary vessel image of the retina, a vein blood vessel image and the like.

The 'internal obtaining device' and the 'external obtaining device' are not necessarily required to be the same authentication type devices and may be devices of different authentication types.

The 'controller' is configured to execute the respective processing shown in FIG. 2 and the like by the CPU 11. However, the present invention is not limited thereto. For example, the controller may be configured to execute the respective processing shown in FIG. 2 and the like by a plurality of CPUs, to execute the respective processing shown in FIG. 2 and the like by only a dedicated hardware circuit such as the ASIC 15 and to execute the respective processing shown in FIG. 2 and the like by a CPU and a hardware circuit.

In the above illustrative embodiments, the internal user information 65 corresponding to the internal authentication device 21 is stored in the NVRAM 14, and the external user information 75 corresponding to the external authentication device 30 is stored in the server 51 external to the multi-function device 10. However, the present invention is not limited thereto. For example, both the user information 65, 75 may be stored in the NVRAM 14 or the server 51 external to the multi-function device 10.

In the above illustrative embodiments, the internal authentication device 21 is set to the valid state all the time. However, the present invention is not limited thereto. That is, like the external authentication device 30, the internal authentication device 21 may be configured to be switched between the valid and invalid states.

In the above illustrative embodiments, in the authentication device recognition processing, the CPU 11 is configured to execute the processing of feeding the power to the validated authentication device and stopping the power feeding to the invalidated authentication device. However, the present invention is not limited thereto. For example, the CPU 11 may be configured to obtain the authentication information from the validated authentication device and to execute processing of not receiving the authentication information from the invalidated authentication device. At this time, it is possible to suppress the power consumption of the multi-function device 10 by stopping the power feeding to the invalidated authentication device.

In the above illustrative embodiments, in the login processing, the CPU 11 is configured to determine whether it is possible to log in the multi-function device 10 by the authentication information obtained from the authentication devices 21, 30, i.e., whether it is possible to use all functions using the reading unit 19 and the image forming unit 20. However, the function for which it is determined whether or not to use the same may be limited to the specific functions using the reading unit 19 and the image forming unit 20.

What is claimed is:

1. An image processing apparatus comprising:
    an internal obtaining device configured to obtain authentication information;
    a communication unit configured to perform communication with an external obtaining device that is configured to obtain authentication information;
    an image processing unit configured to execute at least one of image reading and image formation;
    an input unit; and
    a controller,
    wherein the controller is configured to execute determination processing comprising:
        in a case that the controller determines that an authentication based on the authentication information obtained from the internal obtaining device and first reference information is successful, granting a permission for executing image processing by the image processing unit; and
        in a case that the controller determines that an authentication based on the authentication information obtained from the external obtaining device and second reference information is successful, granting the permission for executing the image processing by the image processing unit, wherein the second reference information is different from the first reference information; and
    wherein the controller is configured to execute allotment processing of allotting authentication information which is set as a target for the internal obtaining device and authentication information which is set as a target for the external obtaining device, on the basis of an input from the input unit.

2. The image processing apparatus according to claim 1, wherein the controller is configured to execute device setting processing of setting the reference information corresponding to at least one obtaining device on the basis of an input from the input unit.

3. The image processing apparatus according to claim 1, wherein the controller is further configured to execute:
    determination processing of determining whether corresponding reference information can be referred to, for at least one obtaining device; and
    denial processing of not receiving the authentication information from the obtaining device corresponding to the reference information for which it is determined in the determination processing that the reference information cannot be referred to.

4. The image processing apparatus according to claim 3, wherein in the denial processing, the controller is configured to reduce an amount of power fed to the obtaining device corresponding to the reference information for which it is determined in the determination processing that the reference information cannot be referred to.

5. The image processing apparatus according to claim 1, further comprising a notification unit,
wherein in the case that the controller determines that the authentication information obtained from one obtaining device satisfies a predetermined condition, the controller is configured to execute notification processing of notifying the notification unit that it is possible to execute the determination processing using the other obtaining device.

6. The image processing apparatus according to claim 5, wherein the predetermined condition includes a condition indicating that the controller determines that the authentication based on the authentication information obtained from the one obtaining device and the reference information corresponding to the one obtaining device is not successful so as not to grant the permission for executing the image processing by the image processing unit.

7. The image processing apparatus according to claim 5, wherein the predetermined condition includes:
a condition indicating that the controller determines that the authentication based on the authentication information obtained from the one obtaining device and each reference information of the first reference information and the second reference information is successful so as to grant the permission for executing the image processing by the image processing unit; and
a condition indicating that an information amount of the authentication information obtainable from the other obtaining device is greater than an information amount of the authentication information obtainable from one obtaining device.

8. The image processing apparatus according to claim 1, wherein in the determination processing, the controller is configured to, in response to determining that the authentication based on the authentication information obtained from one obtaining device and the reference information corresponding to the authentication information obtained from one obtaining device is not successful so as not to grant the permission for executing the image processing by the image processing unit, determine whether the permission for executing the image processing by the image processing unit can be granted by determining whether the authentication based on the authentication information obtained from the one obtaining device and the reference information corresponding to the other obtaining device is successful.

9. An image processing apparatus comprising:
an internal obtaining device configured to obtain authentication information;
a communication unit configured to perform communication with an external obtaining device that is configured to obtain authentication information;
an image processing unit configured to execute at least one of image reading and image formation; and
a controller,
wherein the controller is configured to execute determination processing comprising:
in a case that the controller determines that an authentication based on the authentication information obtained from the internal obtaining device and first reference information is successful, granting a permission for executing image processing by the image processing unit; and
in a case that the controller determines that an authentication based on the authentication information obtained from the external obtaining device and second reference information is successful, granting the permission for executing the image processing by the image processing unit, wherein the second reference information is different from the first reference information; and
wherein the controller is configured to execute:
type comparison processing of comparing a type of the authentication information obtainable from the internal obtaining device with a type of the authentication information obtainable from the external obtaining device; and
in a case where it is determined in the type comparison processing that at least a part of types of the authentication information obtainable from the internal obtaining device can be obtained by the external obtaining device, selection processing of:
selecting any one of the internal obtaining device and the external obtaining device as an obtaining source of a specific type of authentication information which is obtainable from both the internal obtaining device and the external obtaining device; and
selecting the other obtaining device as a non-obtaining source of the specific type of authentication information such that the other obtaining device is configured not to accept the specific type of authentication information while being validated.

10. The image processing apparatus according to claim 9, wherein the controller is configured to execute information amount comparison processing of comparing an information amount of the authentication information obtainable from the internal obtaining device with an information amount of the authentication information obtainable from the external obtaining device, and
wherein in the selection processing, the controller is configured to select the obtaining device for which it is determined in the information amount comparison processing that the information amount thereof is greater, as the obtaining source.

11. The image processing apparatus according to claim 9, further comprising a notification unit,
wherein in the case that the controller determines that the authentication information obtained from one obtaining device satisfies a predetermined condition, the controller is configured to execute notification processing of notifying the notification unit that it is possible to execute the determination processing using the other obtaining device.

12. The image processing apparatus according to claim 11, wherein the predetermined condition includes a condition indicating that the controller determines that the authentication based on the authentication information obtained from the one obtaining device and the reference information corresponding to the one obtaining device is not successful so as not to grant the permission for executing the image processing by the image processing unit.

13. The image processing apparatus according to claim 11, wherein the predetermined condition includes:
a condition indicating that the controller determines that the authentication based on the authentication information obtained from the one obtaining device and each reference information of the first reference information and the second reference information is successful so as to grant the permission for executing the image processing by the image processing unit; and a condition indicating that an information amount of the authentication information obtainable from the other obtaining device is greater than an information amount of the authentication information obtainable from one obtaining device.

14. The image processing apparatus according to claim 9, wherein in the determination processing, the controller is configured to, in response to determining that the authentication based on the authentication information obtained from one obtaining device and the reference information corresponding to the authentication information obtained from one obtaining device is not successful so as not to grant the permission for executing the image processing by the image processing unit, determine whether the permission for executing the image processing by the image processing unit can be granted by determining whether the authentication based on the authentication information obtained from the one obtaining device and the reference information corresponding to the other obtaining device is successful.

15. An image processing apparatus comprising:
a first obtaining device within the image processing apparatus, the first obtaining device configured to obtain first authentication information;
a connection interface configured to communicate with a second obtaining device separate from the image processing apparatus, wherein the second obtaining device is configured to obtain a second authentication information;
an image processing unit configured to execute at least one of image reading and image formation;
a storage unit within the image processing apparatus, the storage unit configured to store a first reference information;
a network interface configured to communicate with a server that is separate from the image processing apparatus and configured to store a second reference information, and
a controller within the image processing apparatus,
wherein the controller is configured to:
perform an authentication process comprising:
in a case that the controller receives the first authentication information from the first obtaining device, retrieve the first reference information from the storage unit within the image processing apparatus and determine whether the first authentication information matches the first reference information, and
in a case that the controller receives the second authentication information from the second obtaining device separate from the image processing apparatus via the connection interface, retrieve the second reference information from the server that is separate from the image processing apparatus via the network interface and determine whether the second authentication information matches the second reference information.

16. The image processing apparatus according to claim 15, wherein the controller is further configured to:
in a case that the controller determines that the first authentication information matches the first reference information, grant a permission for using the image processing unit and to control the image processing unit to execute at least one of the image reading and the image formation;
in a case that the controller determines that the first authentication information does not match the first reference information, not to grant the permission for using the image processing unit;
in a case that the controller determines that the second authentication information matches the second reference information, grant the permission for using the image processing unit and control the image processing unit to execute at least one of the image reading and the image formation; and
in a case that the controller determines that the second authentication information does not match the second reference information, not to grant the permission for using the image processing unit.

17. An image processing apparatus comprising:
an internal obtaining device configured to obtain authentication information;
a communication unit configured to perform communication with an external obtaining device that is configured to obtain authentication information;
an image processing unit configured to execute at least one of image reading and image formation; and
a controller,
wherein the controller is configured to execute determination processing comprising:
in a case that the controller determines that an authentication based on the authentication information obtained from the internal obtaining device and first reference information is successful, granting a permission for executing image processing by the image processing unit; and
in a case that the controller determines that an authentication based on the authentication information obtained from the external obtaining device and second reference information is successful, granting the permission for executing the image processing by the image processing unit, wherein the second reference information is different from the first reference information; and
wherein the controller is further configured to execute:
determination processing of determining whether corresponding reference information can be referred to, for at least one obtaining device; and
denial processing of not receiving the authentication information from the obtaining device corresponding to the reference information for which it is determined in the determination processing that the reference information cannot be referred to; and
wherein in the denial processing, the controller is configured to reduce an amount of power fed to the obtaining device corresponding to the reference information for which it is determined in the determination processing that the reference information cannot be referred to.

18. The image processing apparatus according to claim 17, further comprising an input unit,
wherein the controller is configured to execute device setting processing of setting the reference information corresponding to at least one obtaining device on the basis of an input from the input unit.

19. The image processing apparatus according to claim 17, further comprising a notification unit,
wherein in the case that the controller determines that the authentication information obtained from one obtaining device satisfies a predetermined condition, the controller is configured to execute notification processing of notifying the notification unit that it is possible to execute the determination processing using the other obtaining device.

20. The image processing apparatus according to claim 19, wherein the predetermined condition includes a condition indicating that the controller determines that the authentication based on the authentication information obtained from the one obtaining device and the reference information corresponding to the one obtaining device is not successful so as not to grant the permission for executing the image processing by the image processing unit.

21. The image processing apparatus according to claim 19, wherein the predetermined condition includes:
   a condition indicating that the controller determines that the authentication based on the authentication information obtained from the one obtaining device and each reference information of the first reference information and the second reference information is successful so as to grant the permission for executing the image processing by the image processing unit; and
   a condition indicating that an information amount of the authentication information obtainable from the other obtaining device is greater than an information amount of the authentication information obtainable from one obtaining device.

22. The image processing apparatus according to claim 17, wherein in the determination processing, the controller is configured to, in response to determining that the authentication based on the authentication information obtained from one obtaining device and the reference information corresponding to the authentication information obtained from one obtaining device is not successful so as not to grant the permission for executing the image processing by the image processing unit, determine whether the permission for executing the image processing by the image processing unit can be granted by determining whether the authentication based on the authentication information obtained from the one obtaining device and the reference information corresponding to the other obtaining device is successful.

\* \* \* \* \*